United States Patent Office 3,169,989
Patented Feb. 16, 1965

3,169,989
TRIHALO-SUBSTITUTED ALDOXIME ESTERS
Charles H. Tieman and Marvin Legator, Modesto, Calif., assignors to Shell Oil Company, New York, N.Y., a corporation of Delaware
No Drawing. Filed May 31, 1962, Ser. No. 198,770
6 Claims. (Cl. 260—566)

This invention relates to the chemical preservation of edibles and to novel trihalo-substituted ethanal aldoxime esters useful therefor. More particularly, it is concerned with chloral oxime esters of carboxylic acids, especially chloral oxime esters of alkanoic acids, a method of preserving edibles therewith and edibles containing such esters.

The trihalo-substituted ethanal aldoxime esters of this invention include both the mono-, di- and triesters of both saturated, unsaturated, substituted and unsubstituted mono-, di- and tricarboxylic acids. A particularly suitable class of esters are the trihalo-substituted ethanal aldoxime monoesters represented by the formula

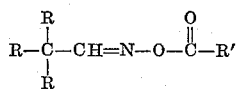

wherein each R represents halogen and R' represents alkyl, cycloalkyl, aryl and simple substituted derivatives thereof. The simple substituents thereon can be halogen, hydroxy, amino, nitro and like groups. Preferably, each R represents a middle-halogen, i.e., chlorine or bromine, R' represents alkyl of 1 to 10 carbon atoms, cycloalkyl of 3 to 6 carbon atoms and aryl of 6 to 10 carbon atoms. Most preferably, each R represents chlorine and R' represents alkyl of 1 to 5 carbon atoms. The most preferred class of esters are the trichloroethanal oxime monoalkanoates, e.g., chloral oxime acetate, derived from monoalkanoic acids.

Representative trihalo-substituted ethanal aldoxime esters include the trihaloethanal oxime monoalkanoates, for example, trichloroethanal oxime acetate (chloral oxime acetate), tribromoethanal oxime acetate, trifluoroethanal oxime acetate, trichloroethanal oxime propionate, tribromoethanal oxime propionate, trichloroethanal oxime butyrate, tribromoethanal oxime butyrate, trichloroethanal oxime valerate, tribromoethanal oxime valerate, trichloroethanal oxime isovalerate, tribromoethanal oxime isovalerate, trichloroethanal oxime caproate, tribromoethanal oxime caproate, trichloroethanal oxime heptanoate, tribromoethanal oxime heptanoate, trichloroethanal oxime nonate, trichloroethanal oxime decanoate, tribromoethanal oxime decanoate and trichloroethanal oxime undecanoate.

Other trihalo-substituted ethanal aldoxime esters include, for example, trichloroethanal oxime benzoate, trichloroethanal oxime alpha-naphthoate, trichloroethanal oxime cyclopropanecarboxylate, tribromoethanal oxime cyclobutanecarboxylate, trichloroethanal oxime cyclopentanecarboxylate, tribromoethanal oxime cyclohexanecarboxylate, trichloroethanal oxime 5-cyclopentylpentanoate, di(trichloroethanal oxime) malonate, di(trichloroethanal oxime) succinate, di(trichloroethanal oxime) glutarate, di(trichloroethanal oxime) tartrate, and tri(trichloroethanal oxime) citrate.

Briefly, the trihalo-substituted ethanal aldoxime esters of this invention can be prepared in two steps. The first step involves the preparation of the trihalo-substituted oxime by reacting a hydroxylamine hydrohalide with a trihalo-substituted aldehyde in an aqueous medium in the presence of calcium chloride. The second step involves the preparation of the corresponding trihalo-substituted aldoxime ester from the trihalo-substituted oxime by reacting the oxime with an organic acid chloride and anhydride, or in the case of the di- and triesters with a bis- or tris(acyl halide), in a non-aqueous medium in the presence or absence of a base. For example, the preparation of chloral oxime acetate can be illustrated by the following two step equation scheme:

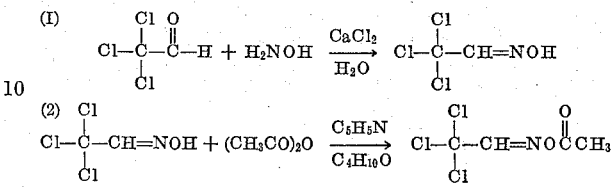

In step (I), chloral and hydroxylamine hydrochloride react in the presence of water and calcium chloride to give chloral oxime. In step (2), chloral oxime and acetic anhydride react in the presence of pyridine and ether to give chloral oxime acetate.

The detailed preparation of a typical trihalo-substituted ethanol aldoxime ester is illustrated by the following example.

EXAMPLE I (a) *Preparation of chloral oxime*

A mixture of chloral hydrate (330 g., 2.00 moles), hydroxylamine hydrochloride (70 g., 1.0 mole) and calcium chloride (220 g.) in 200 ml. of water was stirred and warmed to 50° for one hour. The lower organic layer was separated and the upper aqueous layer was extracted three times with 200 ml. portions of methylene chloride. The lower layer and the extracts were combined, dried with calcium chloride, and most of the solvent was removed under vacuum with a rotary evaporator. The excess chloral was then removed by distilling through a helices-packed column at 25 mm. pressure and a maximum kettle temperature of 130° C. The residue was then distilled in a Claisen flask to give the chloral oxime in two fractions: (1) B.P. 80–82° C. (14 mm.), 25 g.; (2) B.P. 82–83° C. (14 mm.), 92 g. Purity of fraction (1) was 75% by GLC. Overall yield of chloral oxime was 71%.

(b) *Preparation of chloral oxime acetate*

Acetic anhydride (175 g., 1.7 moles) was added over a period of fifteen minutes to a solution of chloral oxime (272 g., 1.67 moles) prepared as in (a) and pyridine (134 g., 1.7 moles) in 300 ml. of ether at 0° C. The reaction mixture was then gradually warmed to 25° C. over a two hour period and then allowed to stand 2 hours at 25° C. The reaction mixture was diluted with 500 ml. of ether and 100 ml. of hexane and washed successively with two portions of 300 ml. of water, five portions of 100 ml. of 5% aqueous hydrochloric acid, and 200 ml. of saturated sodium bicarbonate solution. The organic solution was then dried with sodium sulfate, filtered through Celite filter aid, and the solvents were removed at 40° and .05 mm. pressure on a rotary evaporator. The residue, 330 g. (96% yield) of chloral oxime acetate, was a light orange liquid which soon crystallized almost completely.

Analysis calculated for $C_4H_4Cl_3NO_2$.—C, 23.5; H, 2.0; Cl, 52.0; N, 6.8. Found: N, 6.7. Two recrystallizations from hexane gave a colorless solid, M.P. 32–34°. Analysis found.—C, 23.9; H, 2.3; Cl, 51.2.

(c) *Preparation of di (chloral oxime) succinate*

The esters of this invention such as, for example, the diesters, can conveniently be prepared by substituting a bis(acyl halide) for the anhydride. For example, the preparation of the diester, di(chloral oxime) succinate, can be accomplished by substituting succinyl chloride for the acetic anhydride of (b).

It has been discovered that the trihalo-substituted aldoxime esters of this invention are useful for preserving edible food, i.e., they prevent or retard the spoilage of food due to deleterious microorganisms. The method of preserving edibles, especially cheese and meat, with the aldoxime esters herein comprises contacting the edible with a preservative amount of the aldoxime ester. By preservative amount is meant that amount of ester which effectively preserves the edible. This amount, of course, varies with the kind of edible to be preserved, the length of time preservation is desired, the conditions under which the edible is to be stored, the amount of edible, and so forth. In general, the amount of ester necessary to preserve edibles varies from 5 to 1,000 p.p.m., with from 10 to 200 p.p.m. especially preferred for cheese and meat.

The method of preserving edibles with aldoxime esters of the present invention is more fully illustrated by the following examples.

EXAMPLE II.—PRESERVATION OF CHEDDAR CHEESE—SPRAY METHOD

Cheddar cheese was sliced into approximately 1" x ¾" x ⅛" thick slices. Each slice was then inoculated with a spore suspension of penicillium obtained from molded cheddar cheese. The slices were dried at room temperature and then sprayed with various concentrations of chloral oxime acetate. A traveling belt sprayer was used and the chloral oxime acetate was made up in 100 ml. volume in a 25% isopropyl alcohol, 25% acetone, about 50% water plus 0.1% wetting agent solution. The treated slices were placed in a square petri dish alongside similarly inoculated but untreated slices of cheddar cheese and incubated for 10 days before final readings were made. Chloral oxime acetate at a concentration of 100 p.p.m. showed 0% mold reduction over the check (untreated cheese) whereas chloral oxime acetate at a concentration of 500 p.p.m. showed 100% mold reduction over the check. Chloral oxime, itself, at concentrations of 100 and 500 p.p.m. showed 0% mold reduction over the check.

EXAMPLE III.—PRESERVATION OF CHEDDAR CHEESE—DIP METHOD

Cheddar cheese was sliced, inoculated and dried as in Example II. However, chloral oxime acetate was applied by dipping the cheese slices, rather than employing the spray method, for three minutes into water solutions containing chloral oxime acetate. The solutions were prepared by diluting approximately 1% acetone concentrate of chloral oxime acetate. The results of this test are summarized in Table I.

TABLE I

| Chloral oxime acetate (p.p.m.): | Percent mold reduction over check |
|---|---|
| 25 | 100 |
| 100 | 100 |
| 200 | 100 |
| 400 | 100 |
| Sorbic acid: | |
| 1000 | 0 |

From Table I, it may be seen that chloral oxime acetate showed 100% mold reduction over the check (untreated cheese) at all concentrations tested. It is interesting to note that in this particular test a known preservative, sorbic acid, at 1000 p.p.m. showed 0% reduction over the check. In addition to preventing mold development of the treated slices, chloral oxime acetate was also effective in the vapor phase. This was evidenced by the fact that the acetate was sufficiently volatile to substantially protect an adjacent slice of untreated cheese at a concentration of 200 p.p.m. and completely at 400 p.p.m.

EXAMPLE IV.—PRESERVATION OF COTTAGE CHEESE

Chloral oxime acetate has been found effective in delaying souring of cottage cheese. This effectiveness has been shown by plate-count determinations on the preserved cheese. To two half-pint cartons was added enough cottage cheese to fill each carton. Chloral oxime acetate, at different concentrations, was added to 10 cc. of canned milk and then mixed into the cheese. The treated cheese was then divided into two one-half pint cartons (150 gms./carton) and stored at 16° C. The samples were examined at various intervals for organoleptic changes. The results of this test are summarized in Table II.

TABLE II

| | Concentration (p.p.m.) | Time in hours for— | |
|---|---|---|---|
| | | Slight Souring | Souring |
| Control | 0 | 72 | 96 |
| Chloral Oxime Acetate | 5 | | 96 |
| | 10 | 96 | 120 |
| | 25 | 144 | >144 |
| | 50 | 144 | >144 |
| | 100 | >144 | |

Table II shows that chloral oxime acetate increased the shelf life of cottage cheese over the control. With cottage cheese the spoilage is primarily one of bacterial spoilage, whereas with cheddar cheese the problem is primarily one of molding. From Tables I and II it may be seen that chloral oxime acetate combats both forms of spoilage.

EXAMPLE V.—PRESERVATION OF MEAT

A pre-mix of chloral oxime acetate was prepared by dissolving the acetate in acetone and shaking with 10 g. of corn meal until the corn meal was free of acetone. 10 g. of corn meal containing various concentrations of chloral oxime acetate was mixed with 190 g. of ground beef. Five, 50 g. patties were prepared and placed in petri dishes. After 6 days the patties were graded as severe, moderate, mild, or normal, based on odor. The results of this test are summarized in Table III.

TABLE III

| | Concentration (p.p.m.) | Putrefaction as Evaluated by Odor |
|---|---|---|
| Chloral Oxime Acetate | 10 | Mild. |
| | 50 | Mild–normal. |
| | 100 | Do. |
| Check (untreated) | | Moderate–severe. |

Table III shows that chloral oxime acetate reduced putrefaction in ground beef at from 10 to 100 p.p.m. over the check.

Edibles other than cheese and meat may be preserved by the aldoxime esters of this invention, such as, for example, fish, poultry, bread, fruit, and the like.

While the above examples illustrate specific embodiments of the present invention, it is to be understood that the invention is not to be limited to the exact details therein, as obvious modifications and equivalents will be apparent to one skilled in the art.

We claim as our invention:

1. Aldoximes of the formula

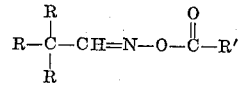

wherein each R represents middle halogen and R' represents alkyl of from 1 to 10 carbon atoms.

2. Aldoximes of the formula

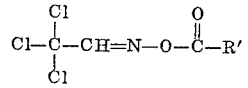

wherein R' represents alkyl of from 1 to 5 carbon atoms.

3.
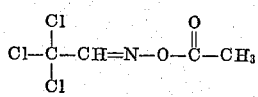
4.
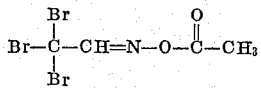
5.
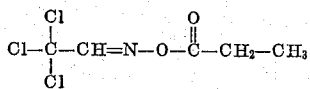
6.
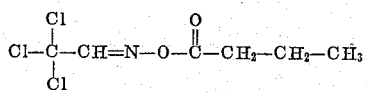
References Cited by the Examiner
UNITED STATES PATENTS
| | | | |
|---|---|---|---|
| 2,668,115 | 2/54 | Wolf | 99—154 |
| 2,668,116 | 2/54 | Wolf | 99—154 |
| 2,880,238 | 3/59 | Kundiger et al. | 260—566 |
| 3,040,097 | 6/62 | Bachman et al. | 260—566 |
OTHER REFERENCES
Beilstein: "Organische Chemie," vol. 2, p. 186 (1920).
Wohler: Ber. Deut. Chem., vol. 38, pp. 1351–1359 (1905).
CHARLES B. PARKER, *Primary Examiner.*
H. LORD, *Examiner.*